(12) United States Patent
Bobinger et al.

(10) Patent No.: US 6,305,701 B1
(45) Date of Patent: Oct. 23, 2001

(54) ONE PIECE MOUNTING BRACKET FOR AUTOMOTIVE SUSPENSION DAMPERS, INCLUDING ATTACHMENT FOR STABILIZER BAR

(75) Inventors: David Adolph Bobinger, Middletown; Piotr Kos, Centerville; Piotr Kosmala, Centerville; Miroslaw Pajak, Centerville, all of OH (US); Kent T. Shiozaki, Honolulu, HI (US); James R. Waag, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/387,334

(22) Filed: Aug. 31, 1999

(51) Int. Cl.$^7$ .................................................... B60G 15/00
(52) U.S. Cl. ............................. 280/124.145; 280/124.134
(58) Field of Search ..................... 280/124.134, 124.145, 280/124.146, 124.149

(56) References Cited

U.S. PATENT DOCUMENTS

| | | | |
|---|---|---|---|
| 4,143,887 | * 3/1979 | Williams et al. | 280/697 |
| 4,223,903 | * 9/1980 | Grabb et al. | 280/96.1 |
| 5,145,204 | * 9/1992 | Perkins | 280/668 |
| 5,669,728 | 9/1997 | Koba . | |
| 5,730,547 | * 3/1998 | Nogami | 403/405.1 |
| 5,797,618 | 8/1998 | Brokholc . | |
| 5,897,124 | * 4/1999 | Schaible et al. | 280/124.146 |
| 6,131,932 | * 10/2000 | Bunker | 280/88 |

* cited by examiner

Primary Examiner—J. J. Swann
Assistant Examiner—L. Lum
(74) Attorney, Agent, or Firm—Robert M. Sigler

(57) ABSTRACT

A one piece mounting bracket for connecting a stabilizer bar and knuckle to a vehicle suspension damper such as a strut includes a body with an engagement surface, which engages the strut and allows the bracket to be connected in generally surface to surface contact with the strut. The bracket further includes a knuckle attachment and a stabilizer attachment extending from the body of the bracket and reinforcing webs interconnecting the knuckle and stabilizer bar attachment.

16 Claims, 2 Drawing Sheets

ONE PIECE MOUNTING BRACKET FOR AUTOMOTIVE SUSPENSION DAMPERS, INCLUDING ATTACHMENT FOR STABILIZER BAR

TECHNICAL FIELD

The subject invention generally relates to a bracket for a suspension damper of a vehicle. More specifically, the invention relates to connecting the strut of a suspension to a knuckle and to a stabilizer bar.

BACKGROUND OF THE INVENTION

A conventional vehicle suspension system requires that a reservoir tube of a suspension damper such as a strut be connected to both a knuckle and a stabilizer bar. This has been accomplished by affixing two separate brackets to the damper, one for the stabilizer bar, and one for the knuckle. An example of this is disclosed in U.S. Pat. No. 5,669,728 to Koba. Koba discloses a bracket that wraps around and is welded to a strut for affixing only a knuckle to the strut. A second bracket is required to affix the stabilizer bar to the strut. An additional example is disclosed in U.S. Pat. No. 5,797,618 to Brokholc, which also teaches a separate bracket for the stabilizer bar and a separate bracket for the knuckle.

Suspension systems having two brackets affixed to the damper, such as those disclosed hereinabove, have inherent limitations. Two brackets welded to the reservoir tube having space therebetween subject the tube to unnecessary stresses from the knuckle and the stabilizer bar. These stresses require significant structural thickness of the tube wall and can lead to a shorter functional life of the strut than would otherwise occur. Using two brackets requires that the brackets be formed from a heavy gage steel for structural integrity. The heavy gage steel adds to the overall mass of the vehicle and to the cost for attaching the stabilizer bar and the knuckle to the strut.

Vehicle suspension systems have historically required high mass steel components to meet the demands of supporting the vehicle while providing a comfortable ride for the occupant. Eliminating suspension components while also reducing the mass of those remaining components can yield a significant overall vehicle mass reduction.

SUMMARY OF THE INVENTION

The present invention overcomes the problems found in known mounting brackets for automotive suspension dampers. The mounting bracket of the present invention is a one piece unit which allows the vehicle knuckle, stabilizer bar and damper to be interconnected. There are numerous advantages to using a one piece bracket. The bracket of the present invention reduces the number of parts that are normally required to connect these vehicle suspension parts and reduces the number of welds necessary to attach the separate bracket pieces to the strut. This reduces weight and manufacturing time. The single bracket also allows for a single thickness of material to be used, reducing weight. The bracket also distributes forces acting upon the bracket more evenly along the strut, allowing lighter materials to be used. In particular, the one piece unit reduces the high stress on the reservoir tube at the top that can occur with conventional two piece mounting brackets.

In the preferred embodiment, the one piece bracket is stamped metal. The bracket includes an engagement surface for engaging a strut and a knuckle attachment extending from the engagement surface for attaching a knuckle to the strut. The bracket further includes a stabilizer bar attachment extending from the engagement surface for attaching a stabilizer bar to the strut.

Utilizing a single bracket for attaching both the knuckle and the stabilizer bar reduces the number of components required for the vehicle suspension. A reduction in the number of components reduces assembly time and material handling costs. The singular design provides the ability to include strengthening webs for joining the knuckle attachment and the stabilizer bar attachment, which provides enough strength to reduce the gage of the steel used to form the bracket, thus further reducing vehicle mass and cost. The strength of the bracket also reduces the stresses on the reservoir tube allowing further vehicle mass reductions by reducing the wall thickness of the tube

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
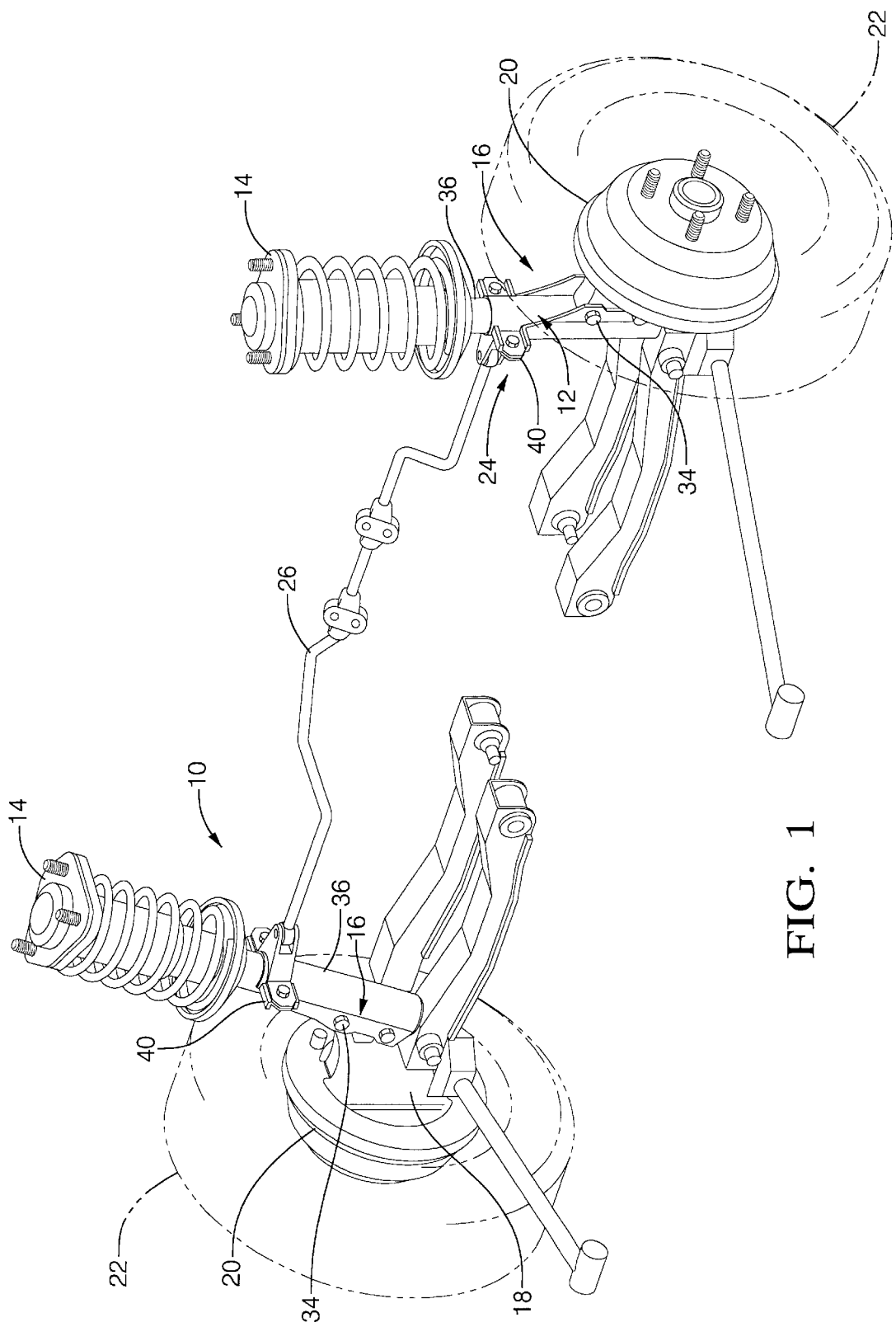
FIG. 1 is a perspective view of the subject invention in a suspension system having the related components attached thereto.
Figure 3:
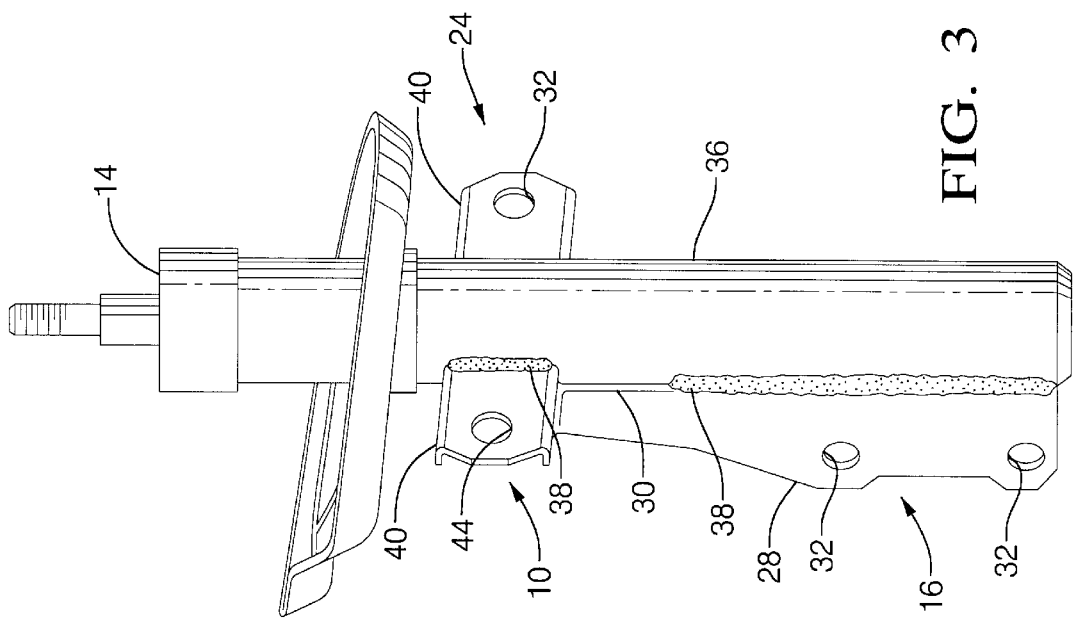
FIG. 3 is a rearward view of the subject invention showing a strut affixed thereto.
Figure 2:
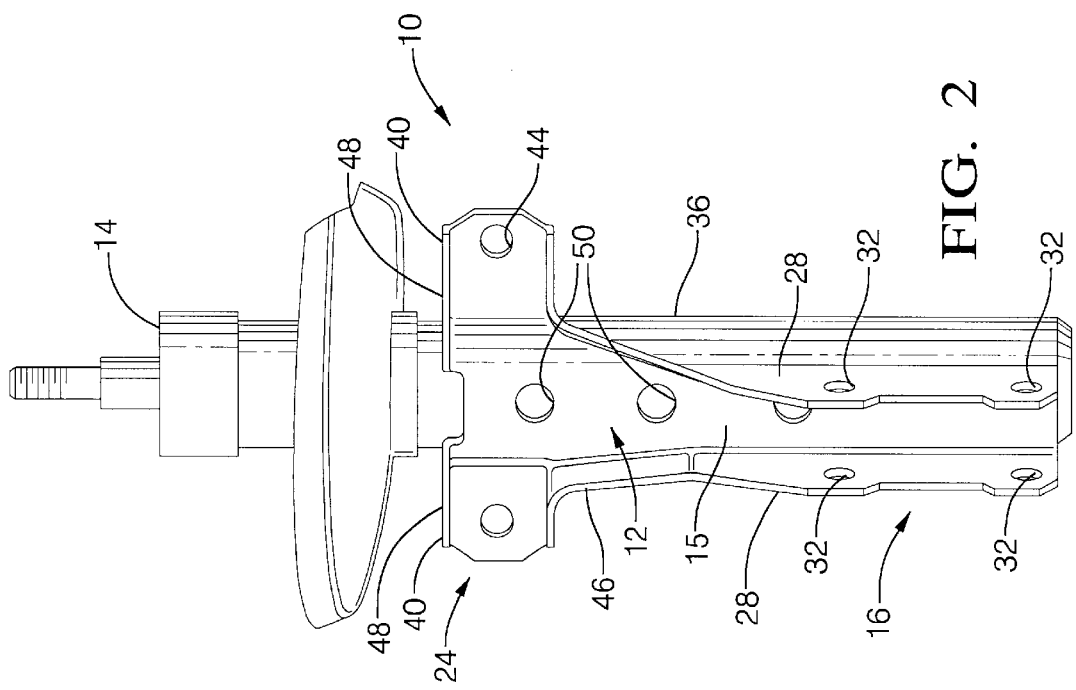
FIG. 2 is a forward view of the subject invention showing a strut affixed thereto.

Referring to the Figures, wherein like numerals indicate like or corresponding parts throughout the several views, a bracket for a suspension damper such as a strut is generally shown at 10. The bracket 10 includes a body portion 12 having an engagement surface 15 for engaging the strut 14 and a knuckle attachment 16 extending from the engagement surface 15 for attaching a knuckle 18 to the strut 14. The knuckle 18 supports a wheel axle (not shown) which rotatably mounts to a wheel hub 20 as is known in the art of vehicle suspension. The hub 20 may also support a brake assembly for the wheel 22.

The bracket 10 further includes a stabilizer bar attachment 24 extending from the body portion 12 for attaching a stabilizer bar 26 to the strut 14. The addition of the stabilizer bar attachment 24 to the bracket 10 eliminates the need for a separate knuckle bracket and a separate stabilizer bar bracket, each of which would engage the strut 14. The combination of a knuckle attachment 16 and a stabilizer bar attachment 24 in one bracket 10 reduces the number of attachments to the strut 14 that are required, which also reduces assembly time. In addition, including both attachments 16, 24 in one bracket 10 facilitates a design geometry that is stronger than the separate brackets and more efficiently distributes the forces acting on the strut from the stabilizer bar 26 and the knuckle 16. This allows for the use of a lighter gage steel resulting in mass reductions for the vehicle.

The bracket 10 is best suited for small and compact vehicles having limited component packaging space and more stringent mass reduction targets, but will also meet the needs of larger vehicles. The preferred length of the bracket ranges form 200 to 250 mm. However, longer (or shorter)

lengths could be used as a particular suspension design may require. While the current intent is for use on original equipment, the bracket 10 is also suitable for after market use.

The knuckle attachment 16 is defined by spaced and generally parallel walls 28 extending from the engagement surface 15 to define generally parallel and spaced edges 30. Each of the walls 28 includes at least one aperture 32 for receiving a fastener 34 to affix the knuckle 18 to the knuckle attachment. The knuckle 18 includes at least one aperture (not shown) aligning with the aperture 32 in the walls 28 for receiving the fastener 34 and securing the walls 28 to the knuckle 18. The present embodiment, as seen in the Figures shows two apertures 32 on each wall 28. However, the number of apertures 32 can vary as a particular suspension design may require.

The engagement surface 15 is curved between the edges 30 to generally mate against the strut 14 in surface to surface contact. The strut 14 includes an outer tube 36, which may be a reservoir tube or an equivalent main body having an outer surface to which a bracket may be attached, as is known in the art of vehicle suspension. The engagement surface 15 mates uniformly with the outer tube 36 allowing welds 38 to be applied at the edges 30 for affixing the bracket 10 to outer tube 36. Alternative fastening methods are contemplated including, but not exclusively laser welding, structural adhesive, or bolting the bracket to the strut (this would require additional fastening brackets), etc.

The stabilizer bar attachment 24 includes stabilizer arms 40 extending from opposite sides of the body portion 12. The stabilizer bar 26 extends cross-car, inboard of the struts 14. Therefore, outer tube 36 is positioned between the stabilizer bar 26 and the bracket 10. Thus the arms 40 must encompass a length greater than the diameter of outer tube 36 providing access for the stabilizer bar 26 to the bracket 10. To provide the requisite length to the arms 40, the bracket 10 is generally T-shaped.

Each of the attachment arms 40 includes at least one arm aperture 44 for receiving a fastener, such as a standard nut and bolt style automotive fastener 34, to affix the stabilizer bar 26 to the arms 40. However, the type and style of fastener 34 is not integral to the subject invention.

A first pair of strengthening webs 46 connects the walls 28 and the arms 40. The webs 46 extend between the walls 28 and the adjoining edge of the arms 40. As disclosed, the webs 46 are angled with respect to the longitudinal centerline 47 of the bracket 10 and a second pair of strengthening webs 48 is positioned on the other side of the arms 40. The webs 46, 48 provide structural integrity to the bracket 10 allowing reduced steel gage to be used to form the bracket 10. For example, 1009 and 1010 gage steel is proposed for use, and thus, a thinner steel can be used. For example, 3 mm thick steel can be used to form the bracket 10. Thus, the bracket 10 also provides a mass reduction for the vehicle. In addition, apertures 50 can be used to further reduce the mass of the bracket 10. A further benefit of the geometry of the bracket 10 and of the webs 46, 48 is the option to eliminate high strength steel resulting in additional cost savings to the manufacturer.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A bracket for mounting a vehicle knuckle and stabilizer bar to a vehicle strut, said bracket comprising:

a body portion configured for attachment to a vehicle strut;

a stabilizer attachment extending from said body portion configured for attaching a stabilizer to said body portion, wherein said stabilizer attachment includes opposed mounting arms extending outwardly from said body portion, said mounting arms having first and second opposed sides;

a knuckle attachment extending from said body portion configured for attaching a knuckle to said body portion;

said stabilizer attachment and said knuckle attachment being spaced from one another along said body portion; and wherein said stabilizer and said vehicle knuckle are attached to the vehicle strut through a single bracket.

2. The bracket of claim 1, wherein said mounting arms are generally flat and include at least one strengthening lip extending generally perpendicular to said mounting arms along said first side of said mounting arms.

3. The bracket of claim 2, wherein said body portion has a longitudinal centerline, said mounting arms extend generally perpendicular to said longitudinal centerline and said strengthening lip extends generally perpendicular to said mounting arms and said longitudinal centerline.

4. A vehicle suspension assembly, said assembly comprising:

a pair of suspension struts;

a pair of knuckles for pivotally affixing a wheel to said suspension strut;

a stabilizer bar connecting said suspension struts;

said suspension struts each include a bracket having an engagement surface for engaging said strut;

said bracket including a knuckle attachment extending from said engagement surface for attaching said knuckle to said strut, and a stabilizer bar attachment extending from said engagement surface for attaching said stabilizer bar to said strut, wherein said stabilizer bar attachment defines stabilizer arms extending from opposite sides of said engagement surface, said arms having opposed first and second sides;

said knuckle attachment being defined by spaced and parallel walls extending from said engagement surface to define parallel and spaced edges, each of said walls including at least one aperture for receiving a fastener to affix the knuckle to said knuckle attachment and said engagement surface is curved between said edges.

5. An assembly as set forth in claim 4 wherein each of said attachment arms includes at least one aperture for receiving a fastener to affix the stabilizer bar to said arm.

6. An assembly as set forth in claim 5 wherein said bracket is generally T-shaped.

7. An assembly as set forth in claim 6 including a first set of strengthening webs interconnecting said walls and said arms on said first side of said arms.

8. An assembly as set forth in claim 7 including a second set of strengthening webs perpendicular to and interconnecting said arms and said curved engagement surface on said second side of said arms.

9. An assembly as set forth in claim 8 wherein said engagement surface includes at least one aperture for reducing the mass of said assembly.

10. A vehicle suspension damper having an attached bracket for mounting a vehicle knuckle and stabilizer bar, said damper comprising an outer tube and a bracket attached thereto, the bracket comprising:

a body portion attached to the damper;

a stabilizer attachment extending from said body portion configured for attaching a stabilizer to said body portion, wherein said stabilizer attachment includes opposed mounting arms extending outwardly from said body portion, said mounting arms having first and second opposed sides;

a knuckle attachment extending from said body portion configured for attaching a knuckle to said body portion;

said stabilizer attachment and said knuckle attachment being spaced from one another along said body portion; and wherein said stabilizer and said vehicle knuckle are both attached to the damper through the bracket.

11. The vehicle suspension damper of claim 10, wherein said mounting arms are generally flat and include at least one strengthening lip extending generally perpendicular to said mounting arms along said first side of said mounting arms.

12. The vehicle suspension damper of claim 11, wherein said body portion has a longitudinal centerline, said mounting arms extend generally perpendicular to said longitudinal centerline and said strengthening lip extends generally perpendicular to said mounting arms and said longitudinal centerline.

13. A vehicle suspension damper having an attached bracket for mounting a vehicle knuckle and stabilizer bar, said damper comprising an outer tube and a bracket attached thereto, the bracket comprising:

a body portion including an engagement surface with a curved cross-section mating with and engaging the outer tube; the body portion providing attachment of the bracket to the outer tube;

a stabilizer attachment extending from said body portion configured for attaching a stabilizer to said body portion;

a knuckle attachment extending from said body portion configured for attaching a knuckle to said body portion, wherein said knuckle attachment is defined by parallel, upstanding walls extending from said body portion and, with the body portion, forming a concave, axially directed channel with the body portion on the side of the bracket opposite the strut;

said stabilizer attachment and said knuckle attachment being spaced from one another along said body portion.

14. The vehicle suspension damper of claim 13, wherein said upstanding walls and said body portion define opposed edges along which said bracket is welded to said outer tube.

15. The vehicle suspension damper of claim 13, wherein said upstanding walls further form a strengthening web extending between said stabilizer attachment and said knuckle attachment.

16. The vehicle suspension damper of claim 15, wherein said body portion has a longitudinal centerline and said strengthening web is angled outwardly with respect to the longitudinal centerline.

\* \* \* \* \*